(12) United States Patent
Detering

(10) Patent No.: US 6,194,934 B1
(45) Date of Patent: Feb. 27, 2001

(54) CIRCUIT ARRANGEMENT FOR REGENERATING AN INPUT SIGNAL CONTAINING DIGITAL DATA SEQUENCES

(76) Inventor: Volker Detering, Groendahlscher Weg 20, D-46446 Emmerich (DE)

( * ) Notice: Subject to any disclaimer, the term of this patent is extended or adjusted under 35 U.S.C. 154(b) by 0 days.

(21) Appl. No.: 09/155,475
(22) PCT Filed: Mar. 27, 1997
(86) PCT No.: PCT/DE97/00627
 § 371 Date: Sep. 29, 1998
 § 102(e) Date: Sep. 29, 1998
(87) PCT Pub. No.: WO97/37429
 PCT Pub. Date: Oct. 9, 1997

(30) Foreign Application Priority Data

Mar. 29, 1996 (DE) ............................................. 196 12 714

(51) Int. Cl.$^7$ ........................................................ H03K 5/01
(52) U.S. Cl. ........................ 327/165; 327/344; 327/345; 327/363
(58) Field of Search .................................... 327/100, 124, 327/165, 246, 334, 336, 344, 345, 363

(56) References Cited

U.S. PATENT DOCUMENTS 5,274,273 12/1993 Baginski et al. ....................... 327/72

FOREIGN PATENT DOCUMENTS 42 36 774 C2  5/1994 (DE).
0 133 067  2/1985 (EP).
0 389 124  9/1990 (EP).
WO 94/10783  5/1994 (WO).

Primary Examiner—Kenneth B. Wells
(74) Attorney, Agent, or Firm—Bell, Boyd & Lloyd LLC

(57) ABSTRACT

A circuit arrangement, in particular in DECT systems, for the regeneration of an input signal containing characteristic digital data sequences with N>1 allowed discrete values per digital position, having

- conversion means that produce a regenerated digital output signal from the comparison of the input signal with at least N−1 reference level,
- at least one integration element for obtaining the at least one N−1 reference level by integration of the segments of the input signal consisting of the characteristic data sequences,
- a drivable switching means for the activation or, respectively, deactivation of the integration of the input signal,
- a checking means that respectively activates the integration process by driving the switching apparatus at the beginning of a characteristic data sequence in the signal curve and, when the end of the data sequence is recognized, deactivates it again in order to avoid a shifting of the at least N−1 reference levels, as well as
- at least one delay element via which the supplying of the input signal to the at least one integration element takes place with a delay in relation to the supplying of the input signal to the conversion means, whereby a level-falsifying integration beyond the end of a characteristic data sequence is prevented.

5 Claims, 2 Drawing Sheets

DELAY ELEMENT

CIRCUIT ARRANGEMENT FOR REGENERATING AN INPUT SIGNAL CONTAINING DIGITAL DATA SEQUENCES

BACKGROUND OF THE INVENTION

1. Field of the Invention

The present invention relates to a circuit arrangement, in particular for wireless telecommunication apparatuses according to the DECT standard, for the regeneration of an input signal containing characteristic digital data sequences.

2. Description of the Prior Art

In today's data processing installations, communication apparatuses and communication systems, the transmission, storing and processing of data increasingly takes place with the aid of digital technology. Data is thereby stored as sequences of discrete values. This digital coding is based in most cases on a binary representation in which the allowed range of values is limited to two different discrete values, designated as a rule as "HIGH" or "1," and "LOW" or "0." The individual elements positions in a data sequence coded in this way are designated in binary coding as "bits" (from binary digit). However, digital representations are also used with three or more different discrete values in the allowed value range.

If a sequence of digital values is represented as an electrical signal, a signal curve results from a sequence of signal impulses that respectively represent a position of the underlying digital value sequence. In the ideal case, all impulses representing the same digital value are thereby identical to one another and differ clearly, e.g. in form or level height, from impulses that represent other digital values. In this way, each digital value is reversibly and unambiguously allocated to a specific type of impulse.

In digital technology, one very often makes use of a coding in the form of what are called "rectangular impulses" that are equally long among themselves, whereby each impulse includes a signal level that is constant within a range of tolerance and whose height characterizes it. For the signal level, only discrete values are thereby allowed, whose number is equal to the number N of different values in the underlying digital range of values, whereby each digital value is reversibly and unambiguously allocated to one of the signal levels.

In the transmission, storing or processing of digitally coded data with the aid of (generally electrical or optical) signals, in practice, disturbances constantly occur that lead to deviations from the ideal signal curve. If these deviations, e.g. due to repeated transmission of a signal, become too large, the underlying digital value sequence can no longer be recovered unambiguously from the signal and malfunctions may occur. In general, this problem is countered by regenerating the corresponding signals, e.g. after a transmission via a transmission path or during the reading out from a memory, using corresponding means, whereby the original signal curve is reproduced to the greatest possible extent.

From EP 0 133 067 A1, e.g., such an apparatus is known for the regeneration of a readout signal from optical storage diskettes, which includes for the correction of a readout clock signal a deformation circuit connected after a readout processor.

The regeneration of digital signals is also used in wireless telecommunication apparatuses operated, for example, according to the digital DECT standard, in order to free the signals transmitted via radio between the base station and the mobile part (or, respectively, the mobile part and the base station) from disturbances that occur thereby.

A corresponding circuit arrangement for DECT systems as shown in FIG. 1 is disclosed in DE 42 36 774 C2. The binary-coded signal to be regenerated, designated the input signal UE in the following, is thereby supplied to an analog comparator K, which compares it with a reference level $U_{IG}$ and outputs, at its output, the signal $U_A$, regenerated in a sequence of equally long rectangular impulses with identical bit structure. The reference level $U_{IG}$ is obtained by means of segment-by-segment integration of the input signal $U_E$ by means of an integration element IG.

The fact is thereby exploited that, according to the DECT standard, in each transmission channel the synchronous initializer word, which includes the first 16 bits of a transmission frame consisting of 420 bits and which serves for synchronization together with the synchronous acknowledgment word including the subsequently following 16 bits, represents a characteristic data sequence. It consists of a periodic alternating bit sequence of HIGH and LOW values, which for the transmission direction "mobile station—base station" begins with "1010 . . . " and for the reverse transmission direction "base station—mobile station" begins with "0101 . . . . ." The integration of an input signal $U_E$, as shown in FIG. 3a, respectively extends only to this characteristic bit sequence and is broken off with the aid of a switch $S_1$, driven by a checking apparatus CTRL, if after the synchronous initializer word two identical bit values follow one another in succession for the first time. In this way, there results, as shown in FIG. 3b, a reference level $U_{IG}$, approximately at the height of the average value $U_{DC}$ of the HIGH and LOW levels of the input signal $U_E$, which is stable during the regeneration of the subsequently following signal curve. However, a disadvantage of the disclosed solution is that the first bit value identical to the immediately preceding one is not recognized until integration has already taken place over the associated signal impulse, whereby a reference level $U_{IG}$ results that is offset in relation to its previous value $U_{DC}$. This undesired offset UOFF of the reference level must then subsequently be corrected, via an adder component ADD, by means of an offset compensation unit OK, connected with a switch $S_2$. The magnitude of the offset $U_{OFF}$ to be corrected is thereby dependent on the level of the input signal $U_E$.

If, as is also the case for the DECT wireless transmissions, this input signal $U_E$ arises by means of the demodulation of a radio signal, the magnitude of the offset $U_{OFF}$ to be compensated is dependent on the level of the demodulated signal $U_E$, and thus, according to the type of the modulation, depends, e.g., on the amplitude range or the frequency range of the transmitter. The modulation range of a transmitter can thereby include a wide range of variation.

At least in DECT wireless telecommunication apparatuses, there is a further disadvantage because, due to the synchronous initializer words inverted with respect to one another, the polarity of the required compensation must be opposed for the two directions of transmission "mobile station—base station" and "base station—mobile station."

An object of the present invention is thus to indicate a circuit arrangement, improved in relation thereto, for the regeneration of an input signal containing characteristic digital data sequences, in which the cited disadvantages are avoided.

SUMMARY OF THE INVENTION

This object is solved by means of a circuit arrangement for the regeneration of an input signal containing characteristic digital data sequences with N>1 different allowed discrete values per digital position which includes:

conversion means that produce a regenerated digital output signal from the comparison of the input signal with at least N−1 reference levels, at least one integration element for the obtaining of the at least N−1 reference level by means of integration of the segments of the input signal that consist of the characteristic data sequences, a drivable switching means for the activation or, respectively, deactivation of the input signal, a checking means that respectively activates the integration process by driving the switching means at the beginning of a characteristic data sequence and, when the end of the data sequence is recognized, deactivates it in order to avoid a shifting of the at least N−1 reference levels, as well as at least one delay element, via which the supplying of the input signal to the at least one integration element takes place with a delay in relation to the supplying of the input signal to the conversion means, whereby a level-falsifying integration beyond the end of a characteristic data sequence is prevented.

All the disadvantages connected with an offset compensation are thereby avoided. Moreover, the present invention results in, as a rule, a significantly lower outlay of material and costs in relation to the use of a compensation unit.

According to a first embodiment of the inventive circuit arrangement, the at least one delay element is fashioned in the form of an RC element.

Alternatively, according to a second embodiment of the present invention, the delay element can also be fashioned in the form of several RC elements connected in series, whereby almost any delay times can be set, even using low-cost commercially available standard components.

According to a further embodiment of the present invention, the conversion means are fashioned in the form of at least one analog comparator. Low-cost standard components can thereby be used, in particular in binary digital systems.

In a further embodiment of the inventive circuit arrangement, in the case N>2 at least one of the at least N−1 reference levels is generated not directly by a separate integration element, but rather by derivation from another reference level produced by the at least one integration element. This can take place, e.g., by means of one or more voltage dividers. There thereby results on the one hand a savings of material and space and on the other hand, the loading of the input signal by current-sinking integration elements can be reduced.

Additional features and advantages of the present invention are described in, and will be apparent form, the Detailed Description of the Preferred Embodiments and the Drawings.

Figure 1:
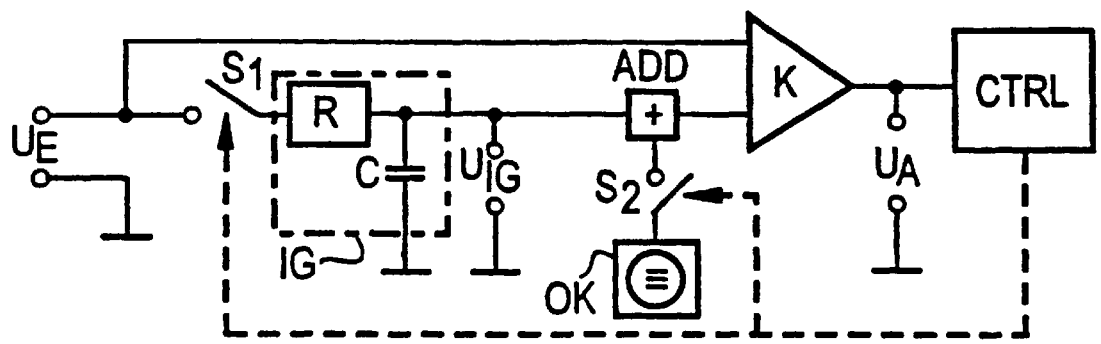
FIG. 1 shows a prior art circuit arrangement for DECT systems apparatus, with reference to FIGS. 2 and 3.
Figure 2:
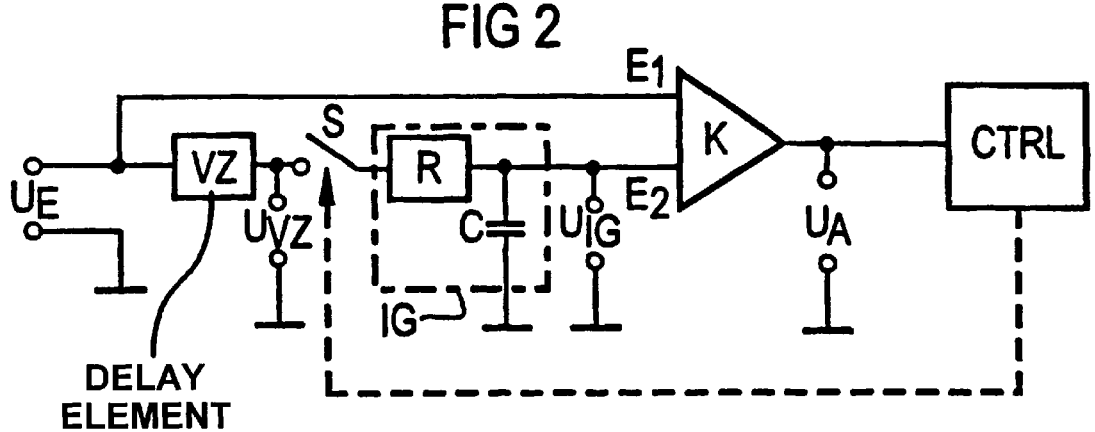
FIG. 2 shows an inventive circuit arrangement for the regeneration of a signal containing binary-coded data, in particular in DECT systems.

b) shows the reference level produced therefrom in a circuit arrangement according to FIG. 1, corresponding to the prior art;

c) shows the corresponding reference level in an inventive circuit arrangement according to FIG. 2.

DETAILED DESCRIPTION OF THE PREFERRED EMBODIMENTS

FIG. 2 shows, as an example, an advantageous embodiment of the inventive circuit arrangement for the case of binary-coded data (N=2), e.g. in a DECT system. The input signal $U_E$ to be regenerated is supplied on the one hand directly to the non-inverting input $E_1$ of an analog comparator K and, on the other hand, via a delay element VZ to an integration element IG, fashioned as an RC element, as a delayed signal $U_{VZ}$. The reference level $U_{IG}$, produced by integration, is adjacent to the second input $E_2$ of the comparator. The comparator K compares the input signal $U_E$ with the reference level $U_{IG}$ and outputs at its output the signal $U_A$, which is regenerated in a sequence of equally long rectangular impulses with identical bit structure. A subsequently connected checking means CTRL recognizes in the curve of this regenerated signal $U_A$ the characteristic bit sequences respectively determined for the integration; e.g., in a DECT system, such bit sequence are the synchronous initializer words. The integration of the input signal $U_E$ for the production of the reference level $U_{Ig}$ is limited to the signal segments containing such characteristic bit sequences, in that the checking means CTRL activates or, respectively, deactivates the integration process by respectively driving a switching means S if the beginning or, respectively, the end of one of these bit sequences is recognized.

Figure 3A:
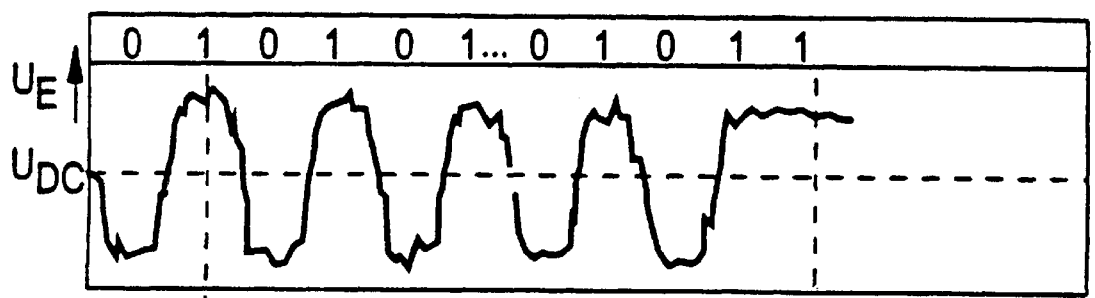
FIGS. 3 a) shows the chronological curve of an input signal $U_E$ to be regenerated, for the example of a DECT synchronous initializer word.
Figure 3B:
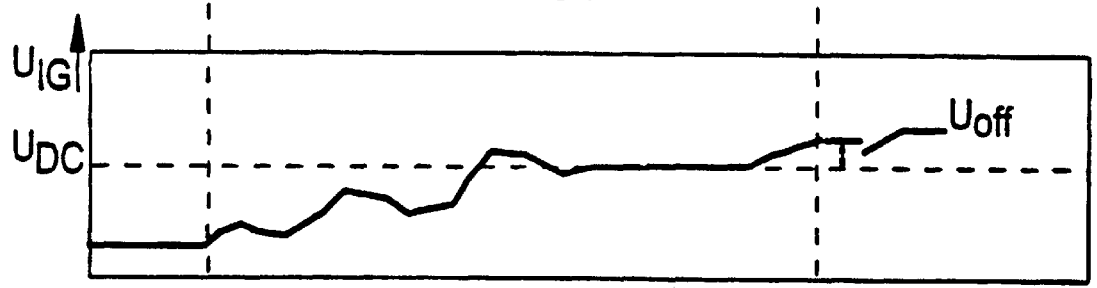
Figure 3C:
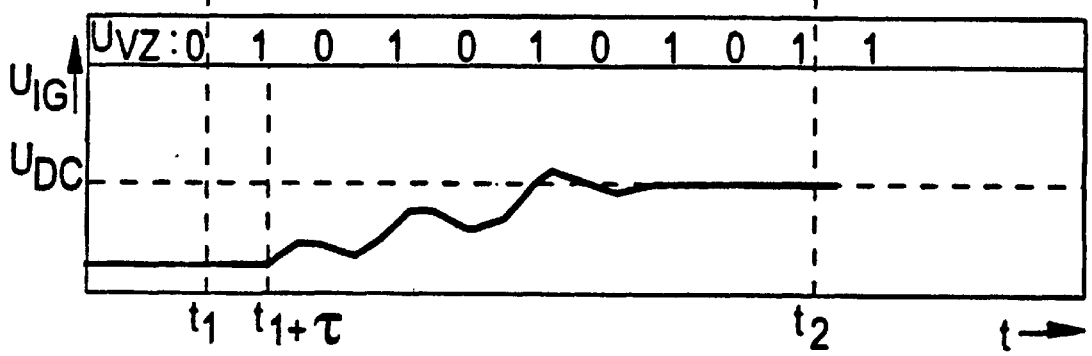

The signal curves of an input signal $U_E$ to be regenerated and of the reference level $U_{IG}$ respectively produced by means of integration are shown in FIG. 3 for the two circuit arrangements according to FIGS. 1 and 2, for the example of a DECT synchronous initializer word. The bit sequences in FIG. 3 thereby relate to the transmission direction "base station—mobile station" of a DECT system, and the respective circuit arrangement is used in the receiving mobile station. At a time $t_1$ at the beginning of the synchronous initializer word in the input signal $U_E$, the switch S (or, respectively, $S_1$ in FIG. 1) is closed. In contrast to the circuit in FIG. 1, in which the input signal $U_E$ is integrated directly and already beginning from time $t_1$, in the inventive circuit according to FIG. 2 there takes place an integration of the signal $U_{VZ}$, delayed by the delay element VZ by the time interval τ in relation to $U_E$. In the course of the respective integration process, the reference level $U_{IG}$ is then built up in both cases up to a saturation level $U_{DC}$, approximately at the height of the average value of the HIGH and LOW values of the input signal $U_E$. The end of the synchronous initializer word is recognized by the checking means CTRL if it receives for the first time at time $t_2$ a bit that includes the same value as the immediately preceding one. In the circuit according to FIG. 1, however, this bit still enters into the integration, and thereby leads to an undesired offset $U_{OFF}$ in the reference level $U_{IG}$ before the integration is broken off at $t_2$. In contrast, in the inventive circuit according to FIG. 2 the cited bit is still not at all adjacent to the integration element IG at time $t_2$, if the checking means CTRL terminates the integration by corresponding driving of the switch S. The desired level height $U_{DC}$ of the reference level $U_{IG}$ is thus maintained, and an offset correction is superfluous.

Although the present invention has been described with reference to specific embodiments, those of skill in the art will recognize that changes may be made thereto without departing from the spirit and scope of the invention as set forth in the hereafter appended claims.

What is claimed is:

1. A circuit arrangement for the regeneration of an input signal consisting of characteristic digital data sequences with N>1 allowed discrete values per digital position within each digital data sequence, comprising:

conversion means for producing a regenerated digital output signal from a comparison of the input signal with at least N−1 reference levels;

at least one integration element for obtaining the at least one N−1 reference level by integrating the input signal consisting of the characteristic digital data sequences;

a drivable switching means for activating and deactivating the integration of the input signal;

a checking means that activates the integration process by driving a switching apparatus at the beginning of a characteristic data sequence in a signal curve and, when an end of the data sequence is recognized, deactivates it again in order to avoid a shifting of the at least N−1 reference levels; and at least one delay element via which the supplying of the input signal to the at least one integration element takes place with a delay in relation to the supplying of the input signal to the conversion means, wherein a level-falsifying integration beyond the end of a characteristic data sequence is prevented.

2. A circuit arrangement as claimed in claim 1, wherein the at least one delay element is in the form of an RC element.

3. A circuit arrangement as claimed in claim 1, wherein the at least one delay element is in the form of a plurality of RC elements connected in series.

4. A circuit arrangement as claimed in claim 1, wherein the conversion means is in the form of at least one analog comparator.

5. A circuit arrangement as claimed in claim 1, wherein, in the case where there are N>2 allowed discrete values per digital position, at least one of the at least N−1 reference levels is generated by derivation from another reference level produced by the at least one integration element rather than directly by a separate integration element.

* * * * *